UNITED STATES PATENT OFFICE.

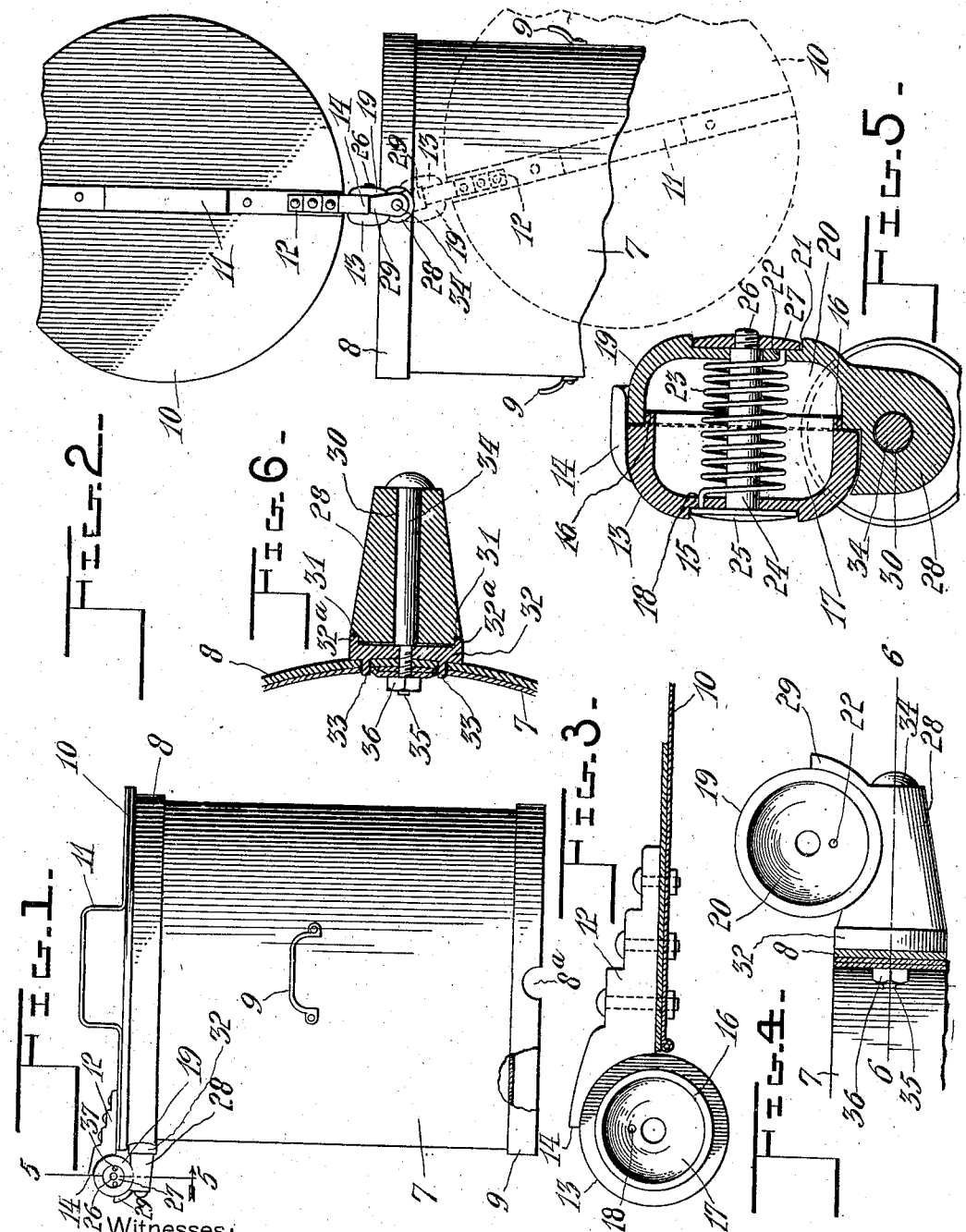

ARTHUR GAGNON AND GEORGE PAQUETTE, OF MONTREAL, CANADA.

RECEPTACLE FOR GARBAGE.

No. 816,087.  Specification of Letters Patent.  Patented March 27, 1906.

Application filed February 4, 1905. Serial No. 244,167.

*To all whom it may concern:*

Be it known that we, ARTHUR GAGNON and GEORGE PAQUETTE, subjects of the King of England, residing at Montreal, Province of Quebec, Canada, have invented certain new and useful Improvements in Receptacles for Garbage; and we do hereby declare that the following is a full, clear, and exact description of the invention, such as will enable others skilled in the art to which it appertains to make and use the same.

Our invention relates to receptacles adapted for use as garbage-receptacles and uses of a similar character.

The object of our invention is to provide a receptacle which may be easily handled by an operator; and to this end a further object of our invention is to provide a closure for the receptacle which will be automatically held on the receptacle until removed by the operator and when removed from over the receptacle will be held in the position in which it is placed by the operator; and our invention consists of the construction, combination, and arrangement of parts as herein illustrated and described.

In the accompanying drawings, forming a part of this application, we have illustrated one embodiment of our invention, in which drawings similar reference-numerals designate corresponding parts, and in which—

Figure 1 is a side elevation, partly broken away, to show the bottom construction. Fig. 2 is a rear elevation showing some of the movable parts in two positions. Fig. 3 is a fragmentary detail in side elevation. Fig. 4 is a fragmentary detail in side elevation. Fig. 5 is a central vertical section taken on the line 5 5 of Fig. 1, and Fig. 6 is a central horizontal section taken on the line 6 6 of Fig. 4.

Referring to the drawings, we provide a cask 7 with upper and lower flanges 8 and with a handle 9. This cask is preferably of metallic water-tight construction and any suitable material conforming to these requirements may be used. The bottom is flanged to permit the operator securing a firm hold thereon, and to this end the bottom flange is provided on each side with a recess 8ª, adapted to receive a hook commonly carried by carters.

The cask 7 is provided with a cover 10, which may be flanged to tightly fit the cask and which is provided with a handle 11, which comprises a strip passing diametrically across the cover and secured thereto in any suitable way. Secured to the cover 10 is a shank 12, preferably disposed on top of the handle-strip 11 for greater strength, suitable bolts or rivets being used for the purpose. The shank 12 is connected to or formed integral with a hemispherical member 13 and is provided with a shoulder 14, (which parts are best shown in Fig. 3.) The outer surface of the member 13 is provided with a recess 15 and on its inner surface is provided with a flange 16, and within said flange said member is formed with a concave depression 17. In the wall of said member there is provided an opening 18, for a purpose to be herein described. A second hemispherical member 19 is provided with an interior concave depression 20, with an outer recess 21, and with an opening 22, similar to the corresponding parts just described. Disposed between the members 13 and 19 is a helical spring 23, its opposite ends thrusting into the openings 18 and 22 in said members, respectively. A bolt 24 is projected through said members, a suitable opening being provided therefor and through said spring, which bolt is provided with a flat head 25, disposed in the recess 15, and its opposite end is provided with screw-threads 26, adapted to receive a flat nut 27, which nut is adapted to draw the parts together and rest in the recess 21, Fig. 5.

Formed integral with or connected to the hemispherical member 19 is a shank 28, provided with a shoulder 29, Fig. 4, through which shank is provided a longitudinal opening 30, and on the free end of which is formed a peripheral recess 31, adapted to receive a washer 32, the edges of which are provided with a peripheral flange 32ª, coinciding with said recess 31. The opposite face of the washer 32 is provided with lugs 33, adapted to enter suitable openings provided in the cask 7 for that purpose, Fig. 6. Disposed in the opening 30 is a bolt 34, having a reduced portion 35 adjacent one end provided with screw-threads adapted to receive a nut 36, by means of which nut and said lugs the shank 28 is firmly secured to the cask 7. As shown in Fig. 1, the nut 27 is provided with openings 37, adapted to receive a suitable instrument, whereby the nut may be rotated.

From the foregoing description it should appear that when the cover is actuated to the position shown in full lines in Fig. 2 the shoulders 14 and 29 will contact to prevent further pivotal movement on the bolt 24. If the cover is released from the said position, it will be forced down on the cask 7 by the spring 23, whereby the same becomes automatically closed. If it is desired to empty the cask 7, the cover is actuated to the position shown in dotted lines in Fig. 2, the shank 28 readily turning on the bolt 34 and the abutting ends of the shank 28 and the washer 32 forming a bearing for that purpose. When in the latter position, the spring 23 causes the cover 10 to contact with the sides of the cask 7, so that the cover is automatically held in that position out of the way of the operator. The recess 15 and the head 25 of the bolt 24 may be made of coinciding shape to prevent the bolt turning when the nut 27 is forced into position.

While we have shown in the accompanying drawings the preferred form of our invention, it will be understood that we do not limit ourselves to the precise form shown, as many of the details may be changed in form or position without affecting the operativeness or utility of the invention or departing from the spirit thereof. Therefore we reserve the right to make all such modifications as are included within the scope of the following claims, or of mechanical equivalents to the structures set forth.

Having thus fully described our invention, what we claim as new, and desire to secure by Letters Patent, is—

1. In a device of the character described, a receptacle, a cover hinged thereto and pivoted to swing in a vertical plane, and resilient means for maintaining the cover in a plurality of positions.

2. In a device of the character described, a receptacle, a cover hinged thereto and adapted to swing in a plurality of directions on two horizontal axes arranged at right angles to each other, and resilient means for maintaining the cover in a plurality of positions.

3. In a device of the character described, a receptacle, a cover attached to the receptacle by a hinge, said hinge having two horizontal axes arranged at an angle to each other, and resilient means for maintaining the cover in a plurality of different positions.

4. In a device of the character described, a receptacle, a cover therefor, a coinciding member carried by the receptacle, a corresponding member carried by the cover, a pivotal member adapted to maintain said coinciding members in operative position, means for actuating said members on said pivotal member, means adapted to limit the movement of said members, and a member pivotally securing one of said members to said receptacle.

5. In a device of the character described, a receptacle, a cover therefor, a coinciding member carried by the receptacle, a corresponding member carried by the cover, each of said members being provided with a recess therein, a pivotal member provided with a flat head and a screw-threaded nut disposed in said recesses, means adapted to actuate said members on said pivotal member, means for limiting the movement of said members, and means for pivotally securing one of said members to said receptacle.

6. In a device of the character described, a receptacle, a cover therefor, a coinciding member carried by the receptacle, a corresponding member carried by the cover, a pivotal member adapted to maintain said coinciding members in operative position, a spring adapted to actuate said members on said pivotal member, means adapted to limit the movement of said members, and means pivotally securing one of said members to the receptacle.

7. In a device of the character described, a receptacle, a cover therefor, a coinciding member carried by the receptacle, a corresponding member carried by the cover, a pivotal member connecting said members, a helical spring wound on said pivotal member and having its ends thrust into said coinciding members, means for limiting the movement of said members on the pivotal member, and means for pivotally securing one of said members to the receptacle.

In witness whereof we have hereunto set our hands in the presence of two witnesses.

ARTHUR GAGNON.
GEORGE PAQUETTE.

Witnesses:
C. C. COUSINS,
N. HENDERSON.